(12) United States Patent
Mukherjee et al.

(10) Patent No.: US 10,275,184 B2
(45) Date of Patent: Apr. 30, 2019

(54) FRAMEWORK FOR VOLATILE MEMORY QUERY EXECUTION IN A MULTI NODE CLUSTER

(71) Applicant: Oracle International Corporation, Redwood Shores, CA (US)

(72) Inventors: Niloy Mukherjee, Belmont, CA (US); Vineet Marwah, San Ramon, CA (US); Hui Jin, Fremont, CA (US); Kartik Kulkarni, Foster City, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 509 days.

(21) Appl. No.: 14/805,949

(22) Filed: Jul. 22, 2015

(65) Prior Publication Data

US 2016/0026684 A1    Jan. 28, 2016

Related U.S. Application Data

(63) Continuation-in-part of application No. 14/565,906, filed on Dec. 10, 2014, now Pat. No. 9,875,259.
(Continued)

(51) Int. Cl.
*G06F 7/02* (2006.01)
*G06F 16/00* (2019.01)
(Continued)

(52) U.S. Cl.
CPC .......... *G06F 3/067* (2013.01); *G06F 16/2471* (2019.01); *G06F 3/061* (2013.01); *G06F 3/064* (2013.01); *G06F 3/0644* (2013.01)

(58) Field of Classification Search
CPC .. G06F 3/067; G06F 3/0631; G06F 17/30194; G06F 17/30864;
(Continued)

(56) References Cited

U.S. PATENT DOCUMENTS 4,782,325 A    11/1988   Jeppsson et al.
5,870,759 A    2/1999    Bauer et al.
(Continued)

FOREIGN PATENT DOCUMENTS

EP    2 608 070 A1    6/2013
GB    1 332 631 A    10/1973
WO    WO2007/078444 A1    7/2007

OTHER PUBLICATIONS

"How the Cache Memory Works_Hardware Secrets," Torres, Gabriel, from hardwaresecrets.com, Sep. 12, 2007.*
(Continued)

*Primary Examiner* — Bruce M Moser
(74) *Attorney, Agent, or Firm* — Hickman Palermo Becker Bingham LLP

(57) ABSTRACT

Techniques are described herein for executing queries on distinct portions of a database object that has been separate into chunks and distributed across the volatile memories of a plurality of nodes in a clustered database system. The techniques involve receiving a query that requires work to be performed on data that resides in a plurality of on disk extents. A parallel query coordinator that is aware of the in-memory distribution divides the work into granules that align with the in-memory separation. The parallel query coordinator then sends each granule to the database server instance with local in memory access to the data required by the granule and aggregates the results to respond to the query.

22 Claims, 12 Drawing Sheets

Related U.S. Application Data

(60) Provisional application No. 62/027,535, filed on Jul. 22, 2014, provisional application No. 62/027,695, filed on Jul. 22, 2014, provisional application No. 62/027,703, filed on Jul. 22, 2014.

(51) Int. Cl.
  *G06F 3/06* (2006.01)
  *G06F 16/2458* (2019.01)

(58) Field of Classification Search
  CPC ......... G06F 17/30312; G06F 17/30321; G06F 17/30289; G06F 16/182; G06F 16/953; G06F 16/22; G06F 16/2228; G06F 16/21; H04L 67/1097
  See application file for complete search history.

(56) References Cited

U.S. PATENT DOCUMENTS

| | | | |
|---|---|---|---|
| 6,009,432 A | 12/1999 | Tarin | |
| 7,010,789 B1 | 3/2006 | Kimelman | |
| 7,188,113 B1 | 3/2007 | Thusoo | |
| 7,849,221 B2 | 12/2010 | Kumar | |
| 8,433,684 B2 | 4/2013 | Munoz | |
| 9,292,564 B2 | 3/2016 | Kamp et al. | |
| 2002/0194157 A1 | 12/2002 | Zait | |
| 2004/0215904 A1 | 10/2004 | Gopisetty | |
| 2005/0055380 A1 | 3/2005 | Thompson et al. | |
| 2006/0013078 A1 | 1/2006 | Goodman | |
| 2006/0173833 A1 | 8/2006 | Purcell et al. | |
| 2006/0182046 A1 | 8/2006 | Dageville | |
| 2008/0059492 A1 | 3/2008 | Tarin | |
| 2008/0235280 A1 | 9/2008 | Schoen | |
| 2008/0281784 A1 | 11/2008 | Zane et al. | |
| 2009/0063516 A1 | 3/2009 | Wang | |
| 2009/0265306 A1* | 10/2009 | Barsness | G06F 17/30312 |
| 2009/0307290 A1 | 12/2009 | Barsness et al. | |
| 2010/0106711 A1 | 4/2010 | Graefe | |
| 2010/0235335 A1 | 9/2010 | Heman et al. | |
| 2011/0029569 A1 | 2/2011 | Ganesh et al. | |
| 2011/0138123 A1 | 6/2011 | Aditya et al. | |
| 2012/0173515 A1 | 7/2012 | Jeong et al. | |
| 2012/0323971 A1 | 12/2012 | Pasupuleti | |
| 2014/0025770 A1* | 1/2014 | Warfield | G06F 15/17331 709/213 |
| 2014/0040218 A1 | 2/2014 | Kimura et al. | |
| 2014/0075493 A1 | 3/2014 | Krishnan et al. | |
| 2014/0337338 A1* | 11/2014 | Shinn | G06F 17/30312 707/737 |
| 2015/0067086 A1* | 3/2015 | Adriaens | H04L 67/1097 709/212 |
| 2015/0088811 A1 | 3/2015 | Hase et al. | |
| 2015/0088822 A1 | 3/2015 | Raja et al. | |
| 2015/0088824 A1 | 3/2015 | Kamp et al. | |
| 2015/0088830 A1 | 3/2015 | Kamp et al. | |
| 2015/0088926 A1 | 3/2015 | Chavan et al. | |
| 2015/0089125 A1 | 3/2015 | Mukherjee et al. | |
| 2015/0089134 A1 | 3/2015 | Mukherjee et al. | |
| 2015/0234895 A1 | 8/2015 | Erdogan | |
| 2015/0339350 A1 | 11/2015 | Baggett | |
| 2016/0026667 A1 | 1/2016 | Mukherjee et al. | |
| 2016/0036905 A1 | 2/2016 | Syed | |
| 2016/0048572 A1 | 2/2016 | Khandelwal | |
| 2016/0350352 A1 | 12/2016 | Hale et al. | |
| 2017/0031988 A1 | 2/2017 | Sun | |
| 2017/0242767 A1 | 8/2017 | Wang | |

OTHER PUBLICATIONS

Paul et al, "Distributed Caching With Centralized Control," Computer Communications vol. 24 pp. 256-268, 2001. (Year: 2001).*
U.S. Appl. No. 14/337,179, filed Jul. 21, 2014, Notice of Allowance, dated Nov. 3, 2015.
U.S. Appl. No. 14/337,179, filed Jul. 21, 2014, Office Action, dated Dec. 29, 2014.
U.S. Appl. No. 14/337,179, filed Jul. 21, 2014, Interview Summary, dated Jun. 17, 2015.
U.S. Appl. No. 14/337,179, filed Jul. 21, 2014, Final Office Action, dated Apr. 10, 2015.
Schaffner, et al., "A Hybrid Row-Column OITP Database Architecture for Operational Reporting", dated 2009, 14 pages.
Ramamurthy, Ravishankar, "A Case for Fractured Mirrors" Proceedings of the 28th VLDB Conference, dated, 2002, 12 pages.
Nirmesh, Malviya, "Recovery Algorithms for In-Memory OLTP Databases", Master of Science Thesis, dated Jul. 1, 2012, 66 pages.
Farber et al., "SAP HANA Database—Data Management for Modern Business Applications", SIGMOD Record, dated Dec. 2011, vol. 40, No. 4, 8 pages.
Shao et al., "Clotho: Decoupled Memory Page Layout from Storage Organization", Proceedings of the 30th VLDB Conference, Toronto, Canada, 2004, 12 pages.
Phipps, Colin:, "Mapping Deflated Files", Internet Article, dated Jan. 6, 2013, http://zsync.moria.org.uk/paper/ch03s02.html, 3 pages.
Khalid Sayood:, "Introduction to data Compression", Morgan Kaufmann Publisher, dated Dec. 1996, 4 pages.
U.S. Appl. No. 14/337,179, filed 074/21/2014, Notice of Allowance, dated Jul. 29, 2015.
Mukherjee, U.S. Appl. No. 14/806,411, filed Jul. 22, 2015, Office Action, dated Oct. 4, 2017.
Muhkherjee, U.S. Appl. No. 14/806,411, filed Jul. 22, 2015, Office Action, dated Oct. 4, 2017.

* cited by examiner

CHUNK-TO-NODE MAPPING

| CHUNK | START ADDR | END ADDR | HOST NODE |
|---|---|---|---|
| CHUNK 302 | 330 | 336 | NODE 102 |
| CHUNK 304 | 336 | 342 | NODE 112 |
| CHUNK 306 | 342 | 350 | NODE 122 |

FIG. 3B

| MAPPING FOR NODE 102 | MAPPING FOR NODE 112 | MAPPING FOR NODE 122 |
|---|---|---|
| 330, 102, NUMA1, 332, IMCU322 | 330, 102, NUMA1, 332, X | 330, 102, NUMA1, 332, X |
| 334, 102, NUMA1, 336, IMCU322 | 334, 102, NUMA1, 336, X | 334, 102, NUMA1, 336, X |
| 336, 112, NUMA2, 338, X | 336, 112, NUMA2, 338, IMCU324 | 336, 112, NUMA2, 338, X |
| 340, 112, NUMA2, 342, X | 340, 112, NUMA2, 342, IMCU324 | 340, 112, NUMA2, 342, X |
| 342, 122, NUMA3, 346, X | 342, 122, NUMA3, 346, X | 342, 122, NUMA3, 346, IMCU326 |
| 348, 122, NUMA3, 350, X | 348, 122, NUMA3, 350, X | 348, 122, NUMA3, 350, IMCU326 |
| 330, 112, NUMA5, 332, X | 330, 112, NUMA5, 332, IMCU322 | 330, 112, NUMA5, 332, X |
| 334, 112, NUMA5, 336, X | 334, 112, NUMA5, 336, IMCU322 | 334, 112, NUMA5, 336, X |
| 336, 122, NUMA6, 338, X | 336, 122, NUMA6, 338, X | 336, 122, NUMA6, 338, IMCU324 |
| 340, 122, NUMA6, 342, X | 340, 122, NUMA6, 342, X | 340, 122, NUMA6, 342, IMCU324 |
| 342, 102, NUMA4, 346, IMCU326 | 342, 102, NUMA4, 346, X | 342, 102, NUMA4, 346, X |
| 348, 102, NUMA4, 350, IMCU326 | 348, 102, NUMA4, 350, X | 348, 102, NUMA4, 350, X |

802 → Group 820
804 → Group 822

FIG. 8

FRAMEWORK FOR VOLATILE MEMORY QUERY EXECUTION IN A MULTI NODE CLUSTER

RELATED APPLICATION DATA AND CLAIM OF PRIORITY

This application claims the benefit of
U.S. Provisional Application No. 62/027,535 titled "Distribution Of An Object In Volatile Memory Across A Multi-Node Database", filed Jul. 22, 2014;
U.S. Provisional Application No. 62/027,695 titled "Framework for Volatile Memory Query Execution in a Multi-Node Database" filed Jul. 22, 2014; and
U.S. Provisional Application No. 62/027,703, filed Jul. 22, 2014,
the contents of all three of which are incorporated by reference for all purposes as if fully set forth herein. This case claims priority as a continuation in part of:
U.S. application Ser. No. 14/565,906, filed Dec. 10, 2014 titled "DISTRIBUTION OF AN OBJECT IN VOLATILE MEMORY ACROSS A MULTI-NODE CLUSTER"; and related to:
U.S. application Ser. No. 14/806,411, filed on the same day herewith titled, "MEMORY-AWARE JOINS BASED IN A DATABASE CLUSTER"
the contents of both of which are incorporated herein by reference as if fully disclosed herein.

FIELD OF THE INVENTION

The present invention relates to data storage and retrieval techniques in a database cluster, and more specifically to a framework for volatile memory query execution in a multi-node database.

BACKGROUND

Database systems typically store database objects (e.g. tables, indexes, etc.) on disk, and load data items from those database objects into volatile memory on an as-needed basis. Once loaded into volatile memory, the data items may remain cached in volatile memory so that subsequent accesses to the same data items will not incur the overhead of accessing a disk. Those data items may be replaced in cache, for example, to make room in volatile memory to store other data items that have been requested.

Rather than load individual data items on a per-item basis, entire database objects, or portions thereof, may be loaded into volatile memory. Various approaches for loading entire database objects, or selected portions thereof, into volatile memory to speed up query processing are described in U.S. patent application Ser. No. 14/377,179, entitled "Mirroring, In Memory, Data From Disk To Improve Query Performance", filed Jul. 21, 2014, referred to herein as the "Mirroring" application, the contents of which are incorporated herein in its entirety.

According to the approaches described in the Mirroring application, data objects, or portions thereof, are stored in volatile memory in a different format than the format that those same objects have on disk. For example, the in-memory version of the objects may be in a column-major format, while the on-disk version stored data in a row-major format. The in-memory version of the object (or selected portions thereof), is referred to as an In-Memory Compression Unit (IMCU) because the data contained therein is often compressed.

In a clustered database system, multiple "nodes" have access to the same on-disk copy of a database. Typically, each node is a computing device with its own local memory and processors that are running one or more database server instances. The database server instances on each of the nodes may receive queries to access the database. The speed at which a given database server instance is able to answer a query is based, at least in part, on whether the node on which the database server instance is running has the requested data cached within its local volatile memory. Consequently, to improve every node's performance of queries that access data in a Table X, Table X may be loaded into the volatile memory of every node in the cluster.

Unfortunately, loading the same data (e.g. Table X) into the volatile memory of every node in a cluster of N nodes means that the cluster can only cache approximately the same amount of data as a single node, even though a cluster of N nodes has N times the amount of volatile memory as a single node.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3B is a block diagram illustrating a chunk to instance mapping;

FIG. 8 is a block diagram illustrating a chunk to instance mapping for redundantly hosted chunks in a multi-node database cluster;

DETAILED DESCRIPTION

Figure 1:
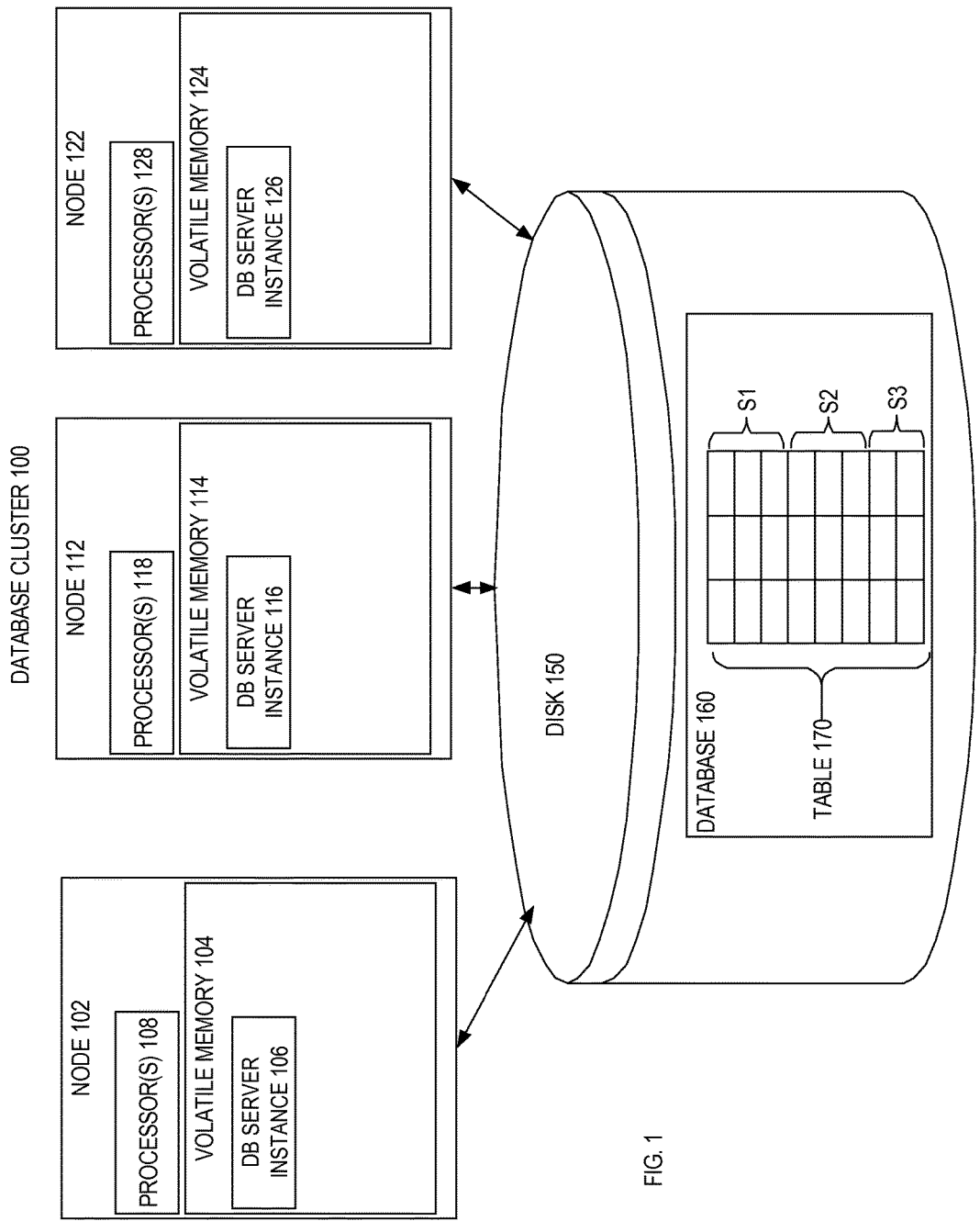
FIG. 1 is a block diagram illustrating a system architecture of a database cluster.

In the following description, for the purposes of explanation, numerous specific details are set forth in order to provide a thorough understanding of the present invention.

It will be apparent, however, that the present invention may be practiced without these specific details. In other nodes, well-known structures and devices are shown in block diagram form in order to avoid unnecessarily obscuring the present invention.

General Overview

Techniques are described herein for distributing distinct portions of database objects across the volatile memories of a plurality of nodes in a clustered database system. The portion of a database object that is assigned to any given node is referred to herein as a "chunk". In some embodiments, within the volatile memory of a node, each such chunk is encapsulated in a distinct IMCU. In alternative embodiments, the in-memory representation of a chunk may have other formats, including the same format in which the data for the chunk is represented on disk. Distributing distinct chunks of the database objects across the nodes avoids the situation in which the same data is consuming volatile memory in every one of the nodes.

In addition, techniques are described herein that allow each node to determine which chunks have been assigned to each node in the cluster, without having to centralize the task of keeping track of the chunk-to-node mapping. In one embodiment, each node is able to independently determine the correct node that is assigned to any given chunk of a database object whose chunks have been distributed among the volatile memories of the various nodes of the cluster.

In addition, techniques are described herein for executing queries against an object when distinct portions of the object are distributed across the volatile memories of multiple nodes. Each of the multiple nodes maintains a sub-chunk-to-node mapping that indicates how data on disk corresponds to the data that has been distributed across the volatile memories of the multiple nodes. Using this sub-chunk-to-node mapping, any database instance in the cluster may generate a query execution plan for a query that targets an object whose chunks have been distributed across the volatile memory of various nodes. Based on the sub-chunk-to-node mapping, such query plans can take advantage of the object's chunks that are already in volatile memory.

Additional techniques are described herein for loading the same chunk of an object into the volatile memories of multiple nodes of the cluster. Each node in the cluster that has been assigned to load a copy of a particular chunk into the node's volatile memory shall be referred to herein as a "host node" of the particular chunk. When the same chunk has been loaded into multiple host nodes, the work of a first query that accesses the chunk is sent to one of the host nodes of the chunk, while work of a second query that accesses the chunk is sent to another of the host nodes of the chunk. Thus, the work of accessing the data in that chunk may be executed in parallel by the various host nodes of the chunk. In addition, if one of the host nodes of a particular chunk fails, the query execution plan for a query that requires access to the particular chunk may be augmented to leverage the copy of the chunk that is in a host node of the chunk that did not fail.

System Overview

Referring to FIG. 1, it is a block diagram that depicts a database cluster 100 according to one embodiment. In the embodiment illustrated in FIG. 1, three nodes 102, 112 and 122 have access to the same database 160. For the purpose of illustration, database 160 is shown as stored on a single shared disk 150, but in alternative embodiments may be spread across multiple disks to which each of nodes 102, 112 and 122 have access.

Nodes 102, 112 and 122 respectively have one or more processors 108, 118 and 128, and local volatile memory 104, 114 and 124. In addition, nodes 102, 112 and 122 are respectively executing database server instances 106, 116 and 126. While in the illustrated embodiment each node is executing a single database server instance, in alternative embodiments a single node may execute more than one database server instance.

Database 160 includes a table 170. Each of nodes 102, 112 and 122 is able to access data items from table 170 from the copy of table 170 that resides on disk 150. However, it is much faster for any given database server instance to access data items of table 170 that are cached in the volatile memory that resides on the node in which the database server instance is executing.

Table 170 is composed of three segments (S1, S2 and S3), where a "segment" is one or more extents, and where an "extent" is a contiguous series of on-disk data blocks. According to one embodiment, if segment S1 of table 170 has been designated as "in-memory enabled", distinct chunks of segment S1 are loaded into each of volatile memories 104, 114 and 124. The loading of the chunks of segment S1 into volatile memories 104, 114 and 124 may be performed pro-actively, or on an as-needed basis. How nodes 102, 112 and 122 determine which chunks of segment S1 are to be loaded into each of nodes 102, 112 and 122 shall be described in greater detail hereafter.

For the purpose of illustration, individual segments of a table are divided into chunks that are distributed among the various nodes of a multi-node system. However, entire table partitions, or entire tables, may be memory-enabled and divided into chunks that are distributed among the various nodes of a multi-node system. The granularity at which the chunks are determined may vary from implementation to implementation, and the techniques described herein are not limited to any particular level of granularity.

Factors in Distributing Chunks of a Database Object Among Nodes

When loading distinct chunks of a segment into the volatile memory of multiple nodes, various factors are taken into account to improve overall query processing performance. For example, during query processing, it is desirable for each of nodes 102, 112 and 122 to perform, in parallel, an approximately equal amount of work. To increase the likelihood that the query processing workload will be balanced, it is desirable for each of nodes 102, 112 and 122 to have approximately the same amount of data from the segment.

In addition, it is important for the distribution scheme to be able to handle situations in which a node fails and/or new nodes are added to the cluster 100. Ideally, rebalancing the workload when such events occur should involve as little downtime and as little inter-node traffic as possible.

Further, it is desirable to minimize cross-node communication required for each of the nodes to determine which chunks are assigned to each of the other nodes. As shall be described in greater detail hereafter, such cross-node communication is minimized by decentralizing the chunk-to-node mapping functions so that each node may independently determine the same chunk-to-node mapping.

Ideally, whether chunks of a segment are distributed across multiple nodes in a cluster should be transparent to the database applications that are sending queries to the cluster. Consequently, techniques are described herein where database applications can send queries that target a memory-enabled segment without having to know or specify which node(s) have the in-memory version of the segment.

Such queries may be sent to the database server instance on any of the cluster's nodes, and that database server instance will return the correct results regardless of whether chunks of the in-memory version of the segment are distributed across multiple nodes.

Lock Managers

According to one embodiment, the locks for any given segment are managed by one of the nodes in the cluster. The node that manages the locks for a segment is referred to herein as the "lock-manager" for that segment. According to one embodiment, the segment-to-lock-manager mapping is based on an identifier associated with the segment. Consequently, given the segment identifier, any node in the cluster 100 is able to determine the lock manager for of any segment.

For the purposes of illustration, it shall be assumed that the lock managers for segments S1, S2 and S3 of table 170 are nodes 102, 112 and 122, respectively. As shall be described in greater detail hereafter, the lock-manager for a segment will receive a lock request from one or more nodes in response to occurrence of an event that triggers the loading of the segment. Events that trigger the loading of a segment are referred to herein as "load-segment events".

Load-Segment Events

A load-segment event is an event that triggers the loading, into volatile memory, of a segment. Various events may trigger the loading of a segment of a memory-enabled object into volatile memory. For example, in some cases, a segment of a memory-enabled object may be loaded into volatile memory upon system start up. In other cases, loading a segment of a memory-enabled object into volatile memory may be triggered by receiving a query that targets data items from the segment of the memory-enabled object. In yet other cases, a database application may submit an explicit request for a particular segment of a memory-enabled object to be loaded into volatile memory. The techniques described herein are not limited to any particular load-segment event.

According to one embodiment, a load-segment event includes a node determining that the segment has not already been loaded into the volatile memory of any node. Such a check may involve inspecting metadata, within the volatile memory of the node performing the check, that indicates which segments have been loaded by any node.

Becoming Load-Operation Master

In a multi-node cluster, a load-segment event for the same segment may concurrently occur in multiple database server instances. For example, a load-segment event for segment S1 of table 170 may occur in both database server instances 116 and 126. According to one embodiment, each of database server instances 116 and 126 responds to occurrence of their respective load-segment event by attempting to obtain an exclusive lock to become the "master" of the load-segment operation for segment S1. The master of a load-segment operation is referred to herein as the "load-operation master". In the present example, because node 102 is the lock manager for segment S1, database server instances 116 and 126 would send a lock request to node 102. An exclusive lock that enables a database server instance to become the master of a load-segment operation is referred to herein as "load-master lock."

For any given load-segment operation, the lock manager of the segment grants only one database server instance the load-master lock. The database server instance that is granted the load-master lock thereby becomes the load-segment master. For the purpose of explanation, it shall be assumed that database server instance 126 on node 122 is granted the load-master lock for segment S1, and that the request from database server instance 116 is declined. In response to having its request declined, database server instance 116 ceases to wait for the load-master lock.

Dividing the Target Segment into Chunks

The database server instance that becomes the load-operation master for a particular segment is responsible for coordinating the loading of that segment into volatile memory. According to one embodiment, the load-operation master reads from a shared disk (e.g. disk 150) metadata that is associated with the segment that is to be loaded. The segment to be loaded is referred to herein as the "target segment".

The metadata associated with the target segment defines the extents that belong to the target segment. Because the disk blocks of an extent are contiguous, an extent may be defined, for example, by (a) the address of the first block in the extent and (b) the length of the extent.

In addition to reading the metadata, the load-operation master determines the desired size and number of chunks for the target segment. A chunk is a set of data, from the target segment, that is to be loaded into the same in-memory container. The number of chunks need not be based on the number of extents in the target segment. Various factors may be used to determine the desired number of chunks, including, for example, the number of nodes in the cluster.

For the purpose of explanation, it shall be assumed that the in-memory containers for the segment will be in-memory compression units. Because the contents of in-memory compression units may be compressed, the size the data occupies on disk is not necessarily the same size that the data will occupy in an in-memory compression unit. Thus, a predicted in-memory size of the data may also be a factor used to determine the on-disk size of the chunks. For example, one rule for breaking up a target segment may be that the predicted in-memory size of each chunk may not fall below a certain threshold size. Such a rule would ensure that a target segment is not divided into chunks that are so small that the benefit that results from distributing the chunks among distinct nodes does not outweigh the overhead costs of distributing the work among so many nodes. In one embodiment, for example, the decision about how to divide the target segment into chunks may be (a) if pims/N>min_size, then divide segment into N equal-sized chunks, and (b) if pims/N<min_size, then divide segment into M equal-sized chunks, where:

"pims" is the predicted in-memory size of the target segment

Figure 2:
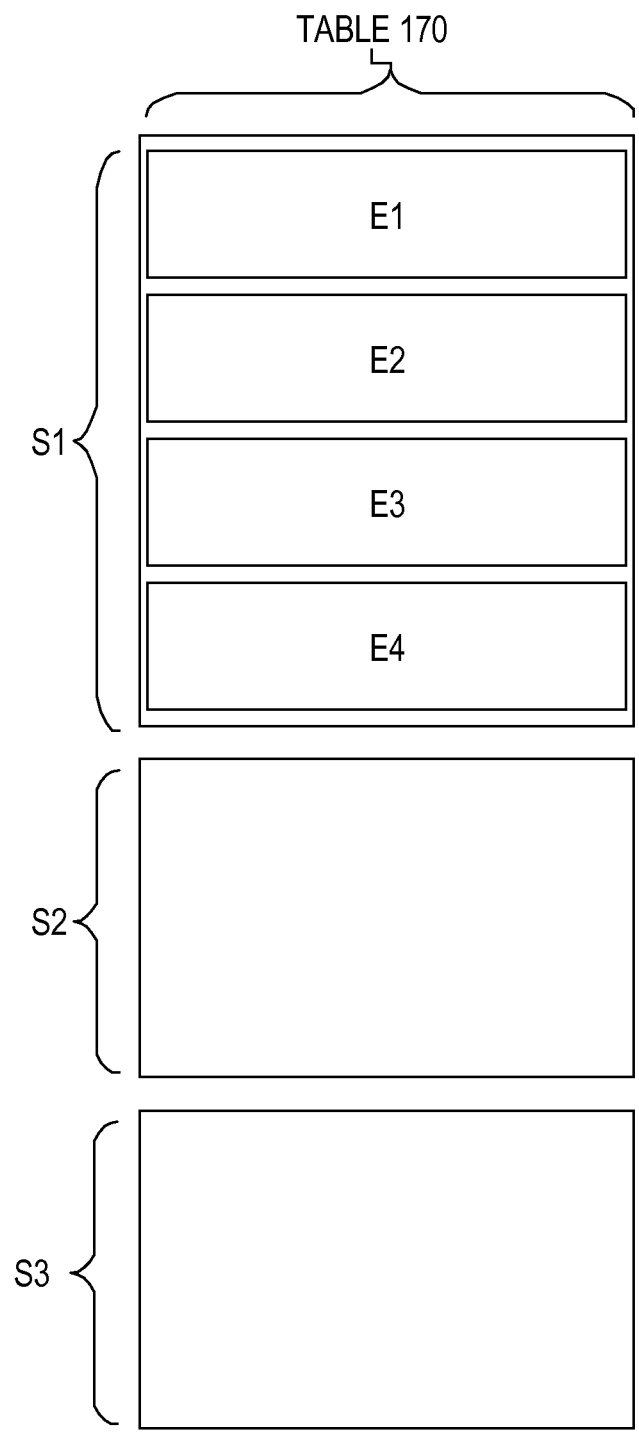
FIG. 2 is a block diagram illustrating a database object composed of segments and segments composted of extents.
Figure 3A:
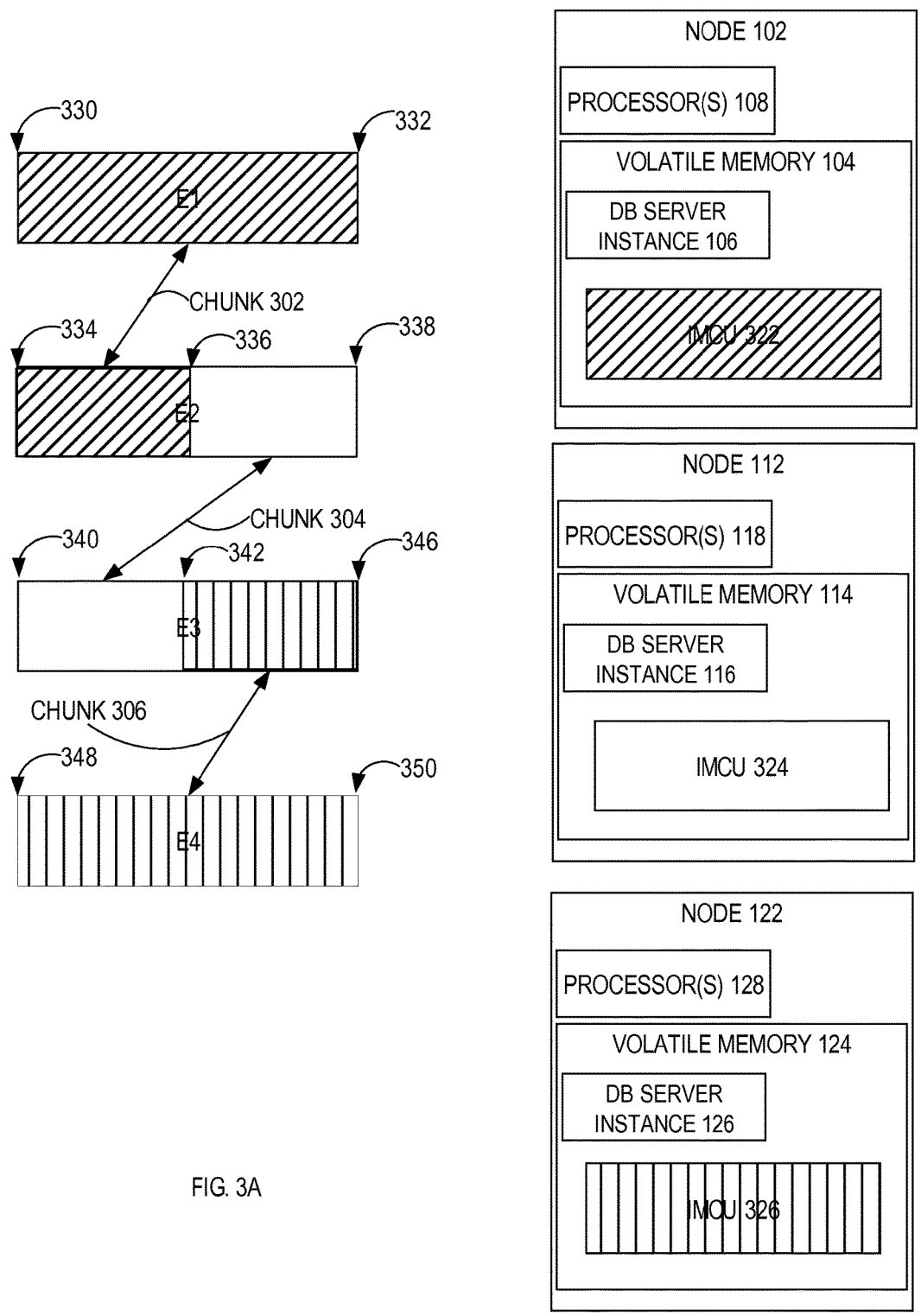
FIG. 3A is a block diagram illustrating a database object divided into chunks and distributed across volatile memory.

"N" is the number of nodes available in the system min_size=minimum threshold for IMCU size M=the highest number by which pims may be divided to produce chunks whose in-memory size is greater than min_size For the purpose of explanation, it shall be assumed that segment S1 has four extents E1, E2, E3 and E4, as illustrated in FIG. 2. It shall be further assumed that database server instance 126 determines that data from these four extents (E1, E2, E3, E4) should be divided into three chunks. Referring to FIG. 3A, it illustrates how the four extents of S1 may be mapped to three chunks 302, 304 and 306. Specifically, data for the first chunk 302 includes all data from extent E1, and some data from extent E2. Data for the second chunk 304 includes the rest of the data from extent E2, and some of the data from extent E3. Finally, data for the third chunk 306 includes the rest of extent E3 and all of extent E4.

Determining Chunk Assignments

Once the data for each chunk has been determined, the load-operation master determines which node will host the IMCU for each chunk. According to one embodiment, the node that is assigned to host the IMCU of any given chunk is determined by applying a hash function to a unique identifier associated with the chunk. For the purpose of illustration, it shall be assumed that the starting address of each chunk is used as the unique identifier for the chunk. However, in alternative embodiments, any other unique identifier for the chunk may be used. In one embodiment, the hash function used for these assignments is a rendezvous hash function. Rendezvous hashing is described in detail at en.wikipedia.org/wiki/Rendezvous_hashing.

In the present example, the rendezvous hash function is applied to the address 330 of the first block of extent E1 to determine the node that is to host the IMCU of chunk 302. According to one embodiment, applying an address 330 to the rendezvous hash function involves:

concatenating a unique identifier of each node (for example the numbers 102, 112, 122) to the address 330, to produce one hash key for each node applying the hash function to each of the three hash keys to produce three hash values, each of which corresponds to one of the nodes the node that corresponds to the highest hash value thus produced is assigned to host the particular node.

In a similar manner, the hash function is used to determine, based on address 336, the node that is to host the IMCU of chunk 304, and to determine, based on address 342, the node that is to host the IMCU of chunk 306. Rendezvous hashing naturally produces desirable effects such as minimal reshuffling during redistribution because the hash values of a particular node/chunk combination do not change, even upon failure of other nodes.

For the purpose of illustration, it shall be assumed that addresses 330, 336, and 342 hash to nodes 102, 112 and 122, respectively. Consequently, node 102 is assigned to host the IMCU for chunk 302, node 112 is assigned to host the IMCU for chunk 304, and node 122 is assigned to host the IMCU for chunk 306. These assignments are illustrated in the chunk-to-node mapping table in FIG. 3B.

Communicating Chunk Assignments

Once the load-operation master has determined the chunk-to-node assignments, the load-operation master broadcasts a message to all other database server instances in cluster 100. According to one embodiment, the message includes various pieces of consistency information, including the target segment metadata (e.g. start address and size of the extents of the target segment), "snapshot information", a list of the database server instances that have been assigned chunks, and "chunk size information".

Snapshot information is information that indicates the state of the target segment that was seen by the load-operation master. The snapshot information is important because that snapshot of the target segment was the basis for the chunk determinations made by the load-operation master. Chunk size information indicates the size of each of chunks 302, 304 and 306. In the case where all chunks are the same size, the chunk size information may be a single size value.

The techniques described herein are not limited to all information being transferred at a single time. For example, the single size value may be pre-stored in each instance to eliminate the need for transferring chunk size information. Along the same lines, in cases where the segment is distributed across all functioning nodes. A list of functioning nodes may be maintained in each instance independently to eliminate the need for transferring a list of database servers that have been assigned chunks.

According to one embodiment, the snapshot information contained in the message sent by the load-operation master may include a snapshot time and an indication of the end of the last extent of the target segment that was seen by the load-operation master. In the present example, the last extent seen by database server instance 126 when making the chunk determination was extent E4. Thus, the snapshot information may include the address 350 of the end of E4. This snapshot information is useful because, between the time the load-operation master determines the chunks and the time the data will actually be loaded, extent E4 may have grown and/or additional extents may have been added to the target segment. Any such post-snapshot data should not be part of the load operation.

The snapshot time indicates the system time at which the load-operation master read the metadata of the target segment. As shall be described hereafter, the snapshot time is used when loading the chunks into memory to ensure that the loaded data reflects the state of the chunks as of the snapshot time.

After sending the message, the load-operation master downgrades the load-master lock from an exclusive lock to a shared lock. In the present example, upon downgrading the load-master lock, database server instance 126 ceases to be the load-operation master for segment S1, and other database server instances can have shared access to segment S1.

Parallel Load Operations

Upon receiving the message from the load-operation master, all nodes that have been assigned to host a chunk send to the lock manager of the target segment a request for a shared mode lock on the target segment. Once the load-operation master has released the exclusive mode lock on the target segment, the lock manager of the target segment grants those shared mode locks.

With the snapshot information and the chunk size information, each database server instance is able to determine the boundaries of each chunk. Having determined the boundaries, each database server instance may apply the same hash function that was used by the load-operation master to determine the chunk-to-node mapping. Thus, in the present example, every database server instance in cluster 100 determines that:

chunk 302 includes address ranges 330-332 and 334-336 and is assigned to node 102 chunk 304 includes address ranges 336-338 and 340-342 and is assigned to node 112 chunk 306 includes address ranges 342-346 and 346-350 and is assigned to node 122

Based on this information, each database server instance may build the chunk-to-node mapping illustrated in FIG. 3B. After determining the chunk assignments, each database server instance that has been assigned a chunk proceeds to load the chunk into its local volatile memory. The data of a chunk is read from disk as that data existed at the snapshot time indicated in the message from the load-operation master. Consequently, for the in-memory version of a chunk, data items that were changed after the snapshot time are rolled back to the state in which they existed as of the snapshot time. Such roll-back operations may be performed, for example, based on undo information maintained by the database system.

As mentioned above, the format of the chunk within volatile memory may vary from implementation to implementation. In an embodiment where chunks are transformed into IMCUs, the loading of the chunk may involve reformatting and/or compressing the data item from the chunk. FIG. 3A illustrates the state of cluster 100 after chunks 302, 304 and 306 have been loaded into nodes 102, 112 and 122, respectively, to create IMCUs 322, 324 and 326.

Sub-Chunk-to-Node Mappings

Figure 4:
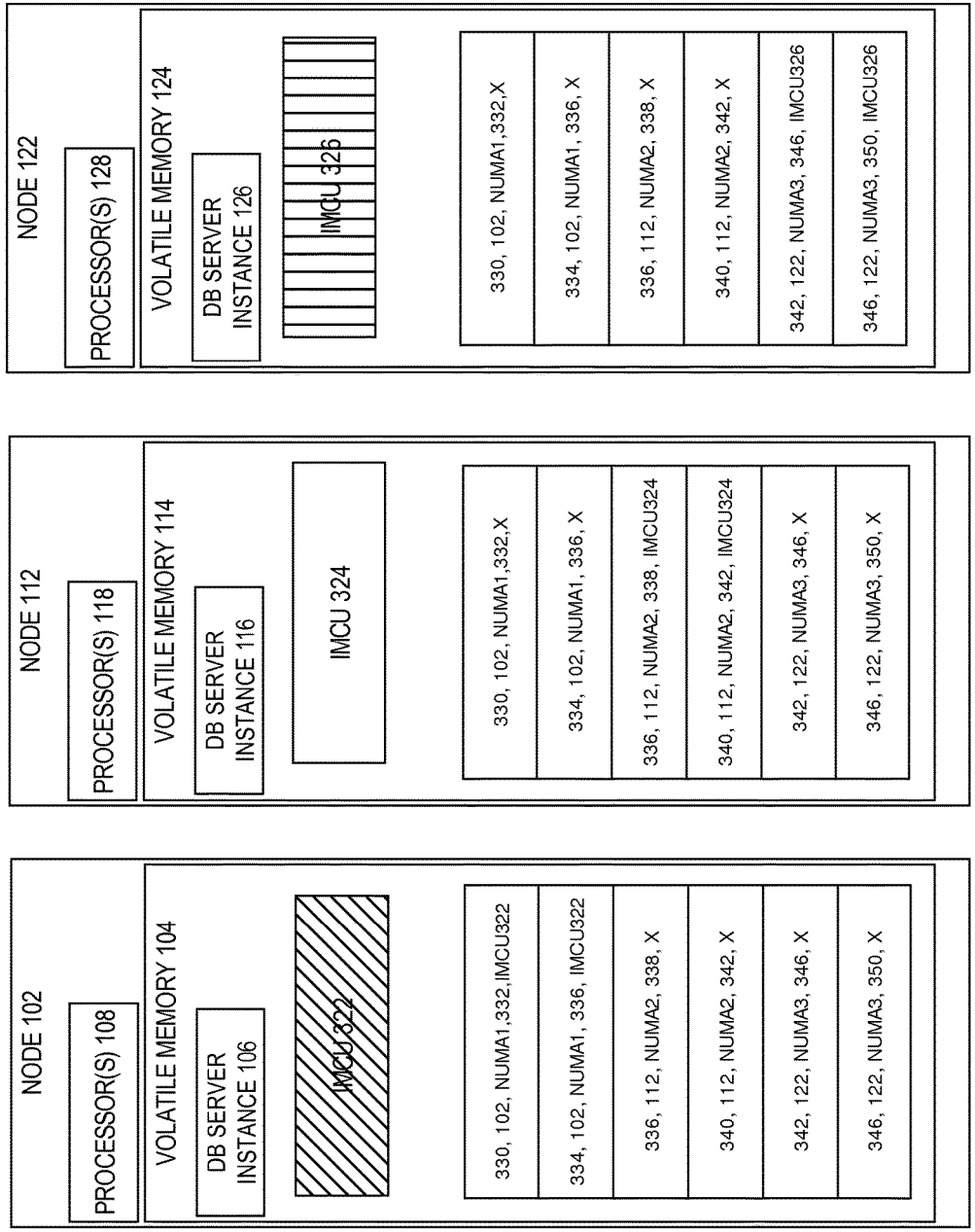
FIG. 4 is a block diagram of a distributed database object in volatile memory of three nodes with an associated chunk-to-node mapping.

A "sub-chunk" refers to a smallest contiguous set of disk blocks with endpoints that align with endpoints from either an on-disk extent or the chunk to which the sub-chunk belongs. Typically, a chunk will have at least as many sub-chunks as the number of extents that are spanned by the chunk. For example, each of chunks 302, 304 and 306 span two extents, so each of chunks 302, 304 and 406 have two sub-chunks. In addition to loading any chunk that is assigned to it, each database server instance in cluster 100 stores in its local volatile memory metadata that reflects sub-chunk-to-node mappings that were determined from the information in the message. FIG. 4 is a block diagram that illustrates the sub-chunk-to-node mapping information maintained by nodes 102, 112 and 122, according to one embodiment. In the embodiment illustrated in FIG. 4, each entry in the sub-chunk-to-node mappings a sub-chunk, and has the form (start address, host node, host socket, end address, IMCU pointer), where:

"start address" is the starting disk address of the corresponding sub-chunk

"host node" is the node that is assigned to host the chunk that contains the corresponding sub-chunk "host socket" is the NUMA socket, within the host node, that has most efficient access to the portion of volatile memory containing the IMCU that contains the corresponding sub-chunk (NUMA-based embodiments shall be described in greater detail hereafter).

"end address" is the end disk address of the corresponding sub-chunk

"IMCU pointer" is a pointer to the location, within local volatile memory, of the IMCU that contains the data of the corresponding sub-chunk Thus, the first entry in the sub-chunk-to-node mappings within node 102 indicates:

"start address"=address 330 (the start of extent E1)
"host node"=node 102
"host socket"=socket 1 within node 102.
"end address"=address 332 (the end of extent E1)
"IMCU pointer"=IMCU 322 (which represents the starting address, within volatile memory 104, of IMCU 322).

According to one embodiment, entries maintained by one node for sub-chunks that are assigned to another node do not have all pieces of information. For example, the third entry in the sub-chunk-to-node mappings of node 102 indicates:

"start address"=address 336 (the start of chunk 304)
"host node"=node 112
"host socket"=socket 2 within node 112.
"end address"=address 338 (the end of extent E2)
"IMCU pointer"=X (which indicates that no value is provided).

No IMCU pointer value is provided for sub-chunks that are stored in the volatile memory of other nodes because such information is not meaningful to a node that cannot directly access that volatile memory.

NUMA Systems

In non-uniform memory access (NUMA) systems, different computing units within the same node have different access rates to different portions of the local volatile memory. The computing units may correspond to multiple processors within the same node and/or multiple cores within a single processor.

As an example of non-uniform access, assume that a node includes computing units A, B and C, each of which has access to the same local volatile memory. Computing unit A may have faster access to address range 1 of that volatile memory, and slower access to ranges 2 and 3. On the other hand, computing unit B may have faster access to range 2, and slower access to ranges 1 and 3. Finally, computing node C may have faster access to range 3, and slower access to ranges 1 and 2.

In such systems, the load operation master may not simply assign chunks to nodes, but may assign chunks to (node/computing unit) combinations. The selection of which computing unit to assign to a chunk may be performed using a hash function in a manner similar to the database server instance-selection technique described above. When a node receives the message from the load-operation master that assigns a chunk to a particular computing unit of the node, the node loads that chunk into the range of volatile memory to which the designated computing unit has faster access.

Redistribution of Chunk Assignments

When a node fails, the IMCUs stored in that node's volatile memory cease to be available for query processing. When a new node is added to a cluster, the volatile memory of the new node becomes available for storing IMCUs. In both of these scenarios, reassignment of some IMCUs is necessary for optimal operation of the cluster.

For example, if node 112 fails, IMCU 324 is no longer available for processing queries that access data items that belong to chunk 304. Ideally, the redistribution of load assignments takes place without having to reassign chunks that are loaded into the nodes that did not fail. Thus, failure of node 112 should not cause chunk 302 or chunk 306 to be reassigned, because data from these chunks reside in the volatile memories of nodes 102 and 122, respectively, which have not failed.

The nature of a rendezvous hash function is such that keys only hash to nodes that are currently considered "candidates" for chunk assignments. Therefore, in response to the failure of node 112, node 112 ceases to be considered a candidate by the hash function. With the change to the set of candidate nodes, the starting addresses of chunks 302 and 306 that are assigned to the non-failed nodes will continue to hash to nodes 102 and 122 respectively. However, because node 112 has ceased to be a candidate, the starting address of chunk 304 will no longer hash to node 112. Instead, the starting address of chunk 304 may hash to node 102. This remains true until either node 102 fails or node 112 is recovered and established once again as a candidate. When node 112 is established once again as a candidate, the starting address of chunk 304 will once again hash to node 112.

Whenever a database server instance receives a request that targets a particular chunk, the database server instance uses the hash function to determine the host node of the particular chunk, and compares the hash-function-determined-host with the host node of the particular chunk indicated in the chunk-to-node map (the "map-specified-host"). If the database server instance determines that the hash-function-determined-host is different than map-specified-host, then the database server instance updates the corresponding entries for the particular chunk in its chunk-to-node mappings and its sub-chunk-to-node mappings. In addition, if a database server instance determines that it itself is the new host node of the particular chunk, then the database server instance loads the chunk into its volatile memory. On the other hand, if a database server instance determines that it itself was the old host node of the particular chunk, and that the particular chunk now maps to another node, then the database server instance can discard from its volatile memory the container that holds the data from the chunk.

For example, assume that, after node 112 fails, address 336 (the start of chunk 304) hashes to node 102 instead of node 112. Under these circumstances, database server instance 106 will detect the discrepancy:
  node 102 is the hash-function-determined-host,
  node 112 is the map-specified host
In response to detecting this discrepancy, database server instance 106 will update the entries associated with chunk 304 to indicate that node 102 is now the host for chunk 304. Database server instance 106 will then proceed to load chunk 304 into its volatile memory 104, thereby creating a new copy of IMCU 324. The new copy of IMCU 324 may be built with data from a snapshot that is different than the snapshot used to create the original copy of IMCU 324. As a result, already existing IMCUs in live nodes will be of earlier snapshots and the new ones of later snapshots. However, as long as a query is issued at a snapshot later than the snapshot of the new IMCUs, all existing and new IMCUs can be used to process the query.

Figure 5:
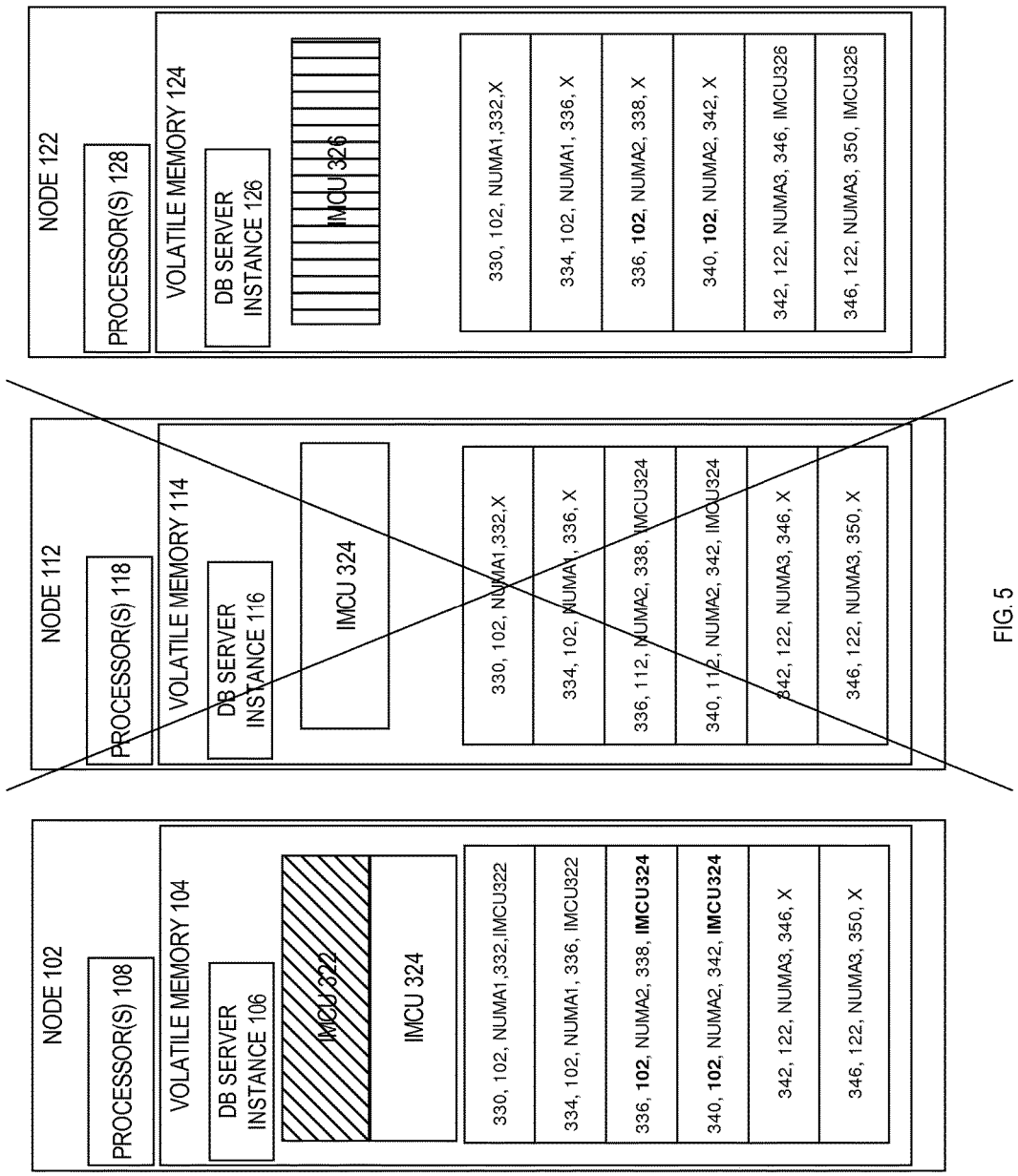
FIG. 5 is a block diagram illustrating a distributed database object in volatile memory of two nodes with an associated chunk-to-node mapping after a node failure has occurred.

Database server instance 126 will also detect the discrepancy and update the appropriate sub-chunk-to-node entries in its sub-chunk-to-node mapping. However, because database server instance 126 is not on the new host node, database server instance 126 will not load the chunk 304 into its volatile memory 124. Referring to FIG. 5, it illustrates the state of the cluster 100 after node 112 has failed, database server instances 106 and 126 have updated their sub-chunk-to-node mappings, and database server instance 106 has created the new copy of IMCU 324 from the data in chunk 304.

When node 112 is recovered and established as a candidate, nodes 102 and 112 will once again detect discrepancies between the hash-function-determined host for chunk 304, and the map-specified host for chunk 304. In response to detecting these discrepancies, database server instances 106 and 126 will update their sub-chunk-to-node mappings. In addition, database server instance 106 discards its copy of IMCU 324, and database server instance 116 creates a new copy of IMCU 324 based on the data from chunk 304. Thus, cluster 100 returns to the state illustrated in FIG. 4.

Embodiments have been described herein in which a node that is assigned a chunk builds the IMCU for that chunk from on-disk data. However, in alternative embodiments, a node that is newly-assigned to host a chunk may determine that a previous host of that chunk is available. This may occur, for example, when the new host is a node that is newly-added to a cluster, and the old host did not fail. Under these circumstances, the new host may request the old host to send the corresponding IMCU data to the new host over the node-to-node interconnect. While sending IMCU data from one host to another may result in a significant amount of message traffic, the overhead of that traffic may be less than the performance impact of rebuilding an IMCU from on-disk data.

Handling Access Requests

IMCUs 322, 324 and 326 are only useful if used to improve the performance of queries that access data in segment S1. Therefore, according to one embodiment, all database server instances in cluster 100 respond to queries that target data from segment S1 by breaking the operation requested by the query into work granules, and distributing those granules based on which node/database server instance/computing unit is hosting the targeted data.

For example, assume that database server instance 106 receives a query to scan the entire segment S1. In response, database server instance 106 creates a first set of one or more work granules to scan the data that resides in chunk 302, a second set of one or more work granules to scan the data that resides in chunk 304, and a third set of one or more work granules to scan data that resides in chunk 306.

After creating the three sets of work granules, database server instance 106 uses its local copy of the chunk-to-node mapping to determine that the first set of work granules should be performed locally by computing unit NUMA1. The second set of work granules should be sent to node 112 to be performed by computer unit NUMA2. The third set of work granules should be sent to node 122 to be performed by computing unit NUMA3.

Each node executes the work granules assigned to it, taking advantage of its local in-memory copy of the chunk that it is hosting. Each node then provides its results back to the node that received the query, and that node provides the results back to the database application that issued the query.

Consistent Maps Across the Nodes

Because each node is able to independently execute the hash function that is used to determine the distribution of chunks among the various nodes, each node is able to independently maintain its chunk-to-node mappings consistent with the mappings maintained by each other node, while requiring little to no cross-database server instance communication to keep the mappings in sync. Thus, the approaches described herein allow parallel query processing to take advantage of the increased amount of volatile memory available in a multi-node system, while minimizing the cross-database server instance communication required for each of the nodes to determine in which other node an in-memory version of each particular chunk has been loaded.

Techniques for Dividing a Query into Work Granules

When a database application desires data from database 160, the database application sends a query to any one of database server instances 106, 116 and 126. The database server instance that receives the query generates a query execution plan based on a locally-stored mapping of how the data is distributed across the volatile memories 104, 114, 124 of the multi-node cluster 100. This query execution plan specifies how the work required by the query is to be separated into work granules that perform work on data from chunks. For example, after consulting the mapping illustrated in FIG. 3B, the database server instance that receives a query that targets segment S1 of table 170 may divide the query into the following work granules:
  a first work granule that performs work on data from segment S1 disk blocks in the address range 330-336,
  a second work granule that performs work on data from segment S1 disk blocks in the address range 336-342,
  a third work granule that performs work on data from segment S1 disk blocks in the address range 342-350.

The database server instance that generates the query execution plan for a query is referred to as the "parallel query coordinator" for the query. Based on the local chunk-to-node mapping, the parallel query coordinator sends the individual work granules to the database instances that reside in the host nodes of the chunks accessed by the work granules. The database server instances to which the parallel query coordinator sends work granules are referred to herein as "parallel query slaves". In the present example, the first, second and third work granules would be assigned to database server instances 106, 116 and 126, respectively.

The parallel query slaves then review their own local mappings, and process these work granules against the IMCUs located in their own local volatile memory. The results produced by the parallel query slaves are sent to and aggregated by the parallel query coordinator. The parallel query coordinator then performs any necessary further processing on the data, and sends a response to the application that submitted the query.

Integrating Query Processing on in-Memory Data with on-Disk Data

Figure 6:
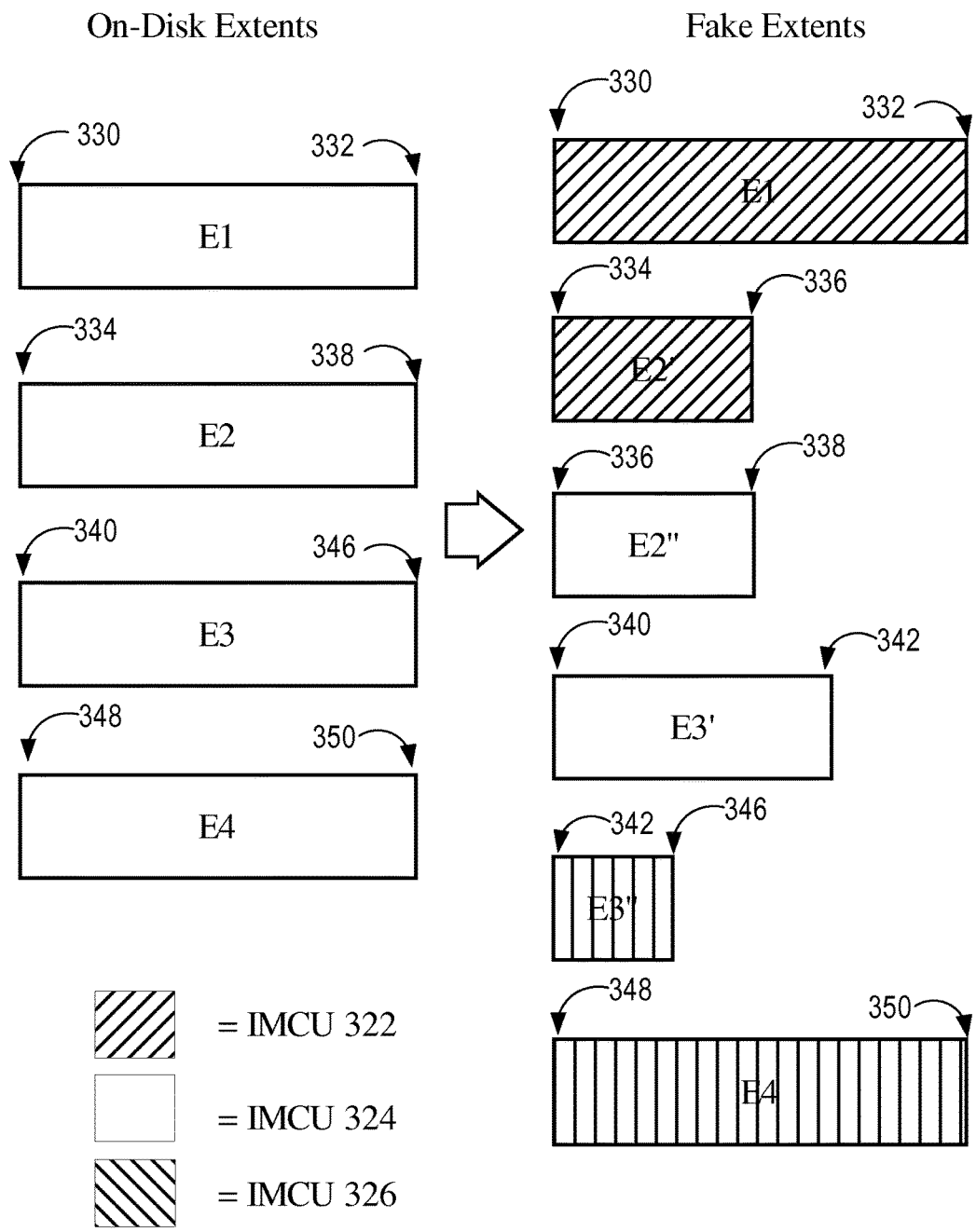
FIG. 6 is a block diagram illustrating how a parallel query coordinator divides a query directed toward data organized in persistent storage to optimize use of data organized in volatile memory.

Typically, before generating a query execution plan, the parallel query coordinator reviews what database objects the query is targeting and how those database objects are broken into extents. The parallel query coordinator then generates a query execution plan based on this extent data. However, for in-memory data, the data, as separated into extents on-disk, does not directly correspond with the data, as separated into chunks in-memory. Thus, when generating a query execution plan, the parallel query coordinator consults the local sub-chunk-to-node mapping presented in FIG. 4 to construct "fake" extents that align with the sub-chunk data. The term "fake extent" refers to an extent definition (e.g. start address and size) that does not necessarily correspond to an on-disk extent. For example, as illustrated in FIG. 6, extent E2 is an on-disk extent that starts at address 334 and ends at address 338. However, for the purpose of work granule creation, the first part of extent E2 (from address 334 to address 336) is treated as a first fake extent E2', and the second part of extent E2 (from address 336 to address 338) is treated as a second fake extent E2".

FIG. 6 is a block diagram illustrating how a parallel query coordinator divides the on-disk extents E1, E2, E3 and E4 into a different set of fake extents E1, E2', E2", E3', E3", and E4. Each of these fake extents is represented by a corresponding entry in the sub-chunk-to-node mappings illustrated in FIG. 4.

After breaking the work required by the query into work granules based on fake extents E1, E2', E2", E3', E3", and E4, the parallel query coordinator determines the host node for each of the fake extents and sends, to each host node, a single message that specifies the work of all work granules that are to be performed by that node. By sending all work that is to be performed by each host node in a single message, the host node is able to execute the work that corresponds to multiple fake extents by making a single pass over the chunk containing the sub-chunks for that fake extent. In the case where a chunk is compressed into an IMCU, the host node is able to make a single pass over the IMCU that stores the data for those fake extents.

For example, a parallel query coordinator may receive the query:
SELECT * FROM S1 WHERE C1=55;

The parallel query coordinator breaks up the query into work granules based on the fake extents. The parallel query coordinator then determines the host node to which the work granules are to be sent based on the mapping in FIG. 4. The parallel query coordinator then creates and sends one message to each host node, where each message indicates all work to be done by that host node. In the present example, the messages sent by the parallel query coordinator would distributed the work as follows:

Database server instance 106 is sent work to be performed on E1 and E2':
SELECT * FROM E1, E2' WHERE C1=55;
Database server instance 116 is sent work to be performed on E2" and E3':
SELECT * FROM E2", E3' WHERE C1=55;
And database server instance 126 is sent work to be performed on E3" and E4:
SELECT * FROM E3", E4 WHERE C1=55;

The parallel query slaves execute the queries against data divided into extents. When a parallel query slave receives a work granule against a particular fake extent, the parallel query slave determines, from its own local mapping as seen in FIG. 4, if the fake extent may be served from an IMCU located in local volatile memory. Because the work granules for a given host node are sent in a single message, the IMCU is only read once by the parallel query slave, rather than, for example, reading the IMCU once for E1 and a second time for E2'.

If for some reason a parallel query slave is unable to process a work granule entirely by accessing data in local volatile memory, the parallel query slave may simply access some or all of the necessary data from disk.

In a NUMA system, the mappings may specify a particular computing unit, in addition to a host node location of an IMCU, as seen in FIG. 4. When the mapping for a particular sub-chunk specifies a particular computing unit within a node, the work granule is sent to the designated node for execution by the designated computing unit.

Redundantly Hosted Chunks

Figure 7:
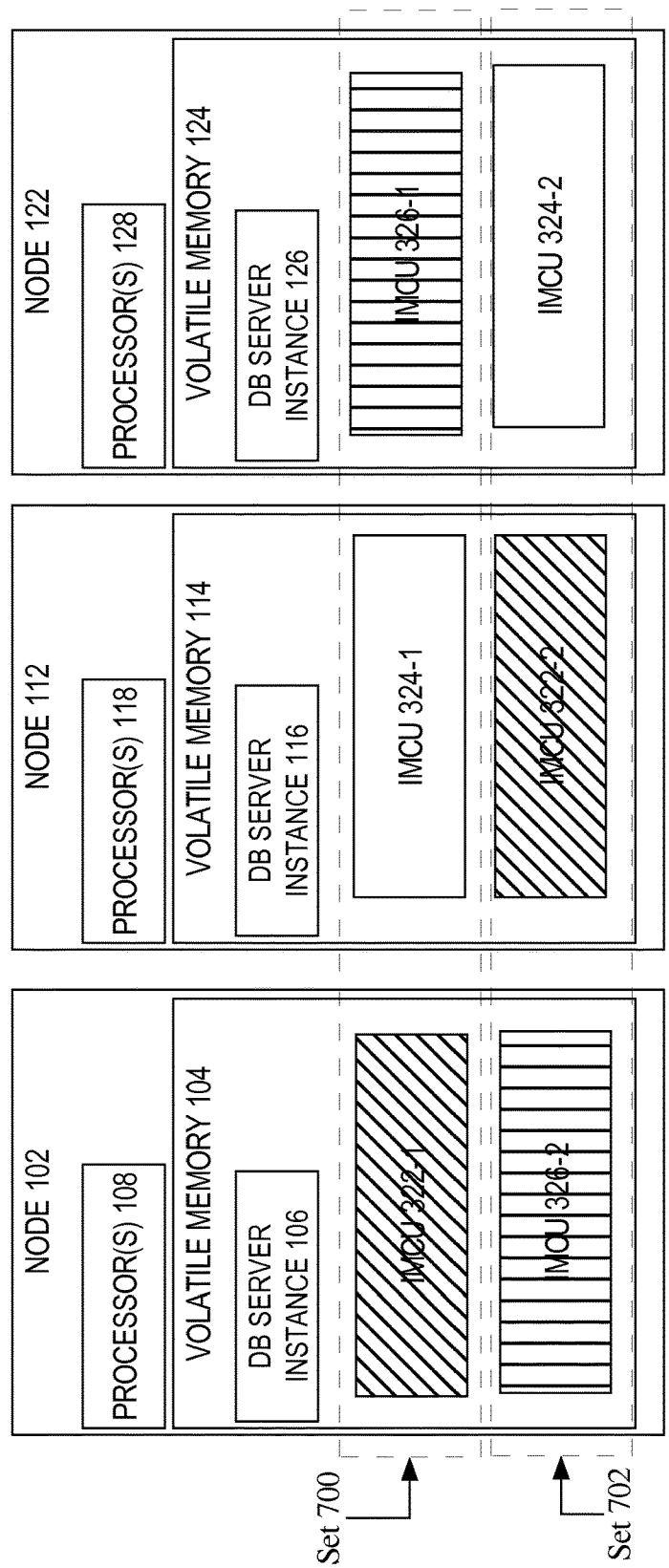
FIG. 7 is a block diagram illustrating redundantly hosted chunks in a multi-node database cluster.

According to one embodiment, the same chunk can be hosted at multiple nodes. FIG. 7 is a block diagram illustrating a how the chunks 302, 304 and 306 into which segment S1 has been divided may be redundantly hosted in a multi-node database cluster. FIG. 7 illustrates the state of cluster 100 after chunks 302, 304 and 306 have been redundantly loaded into nodes 102, 112 and 122. As illustrated in FIG. 7, chunks 302, 304 and 306 are distributed as follows:

Node 102 hosts a copy of IMCU 322-1 (for chunk 302), and a copy of IMCU 326-2 (for chunk 306)
Node 112 hosts a copy of IMCU 324-1 (for chunk 304), and a copy of IMCU 322-2 (for chunk 302)
Node 122 hosts a copy of IMCU 326-1 (for chunk 306) and a copy of IMCU 324-2 (for chunk 304)

In some embodiments, such as the embodiment depicted in FIG. 7, each chunk is loaded by some but not all of the database server instances 106, 116, 126.

Redundant loading may occur during parallel loading operations based on information communicated by the load operation master or by a configuration setting applied to all the database server instances.

Selecting Multiple Hosts for a Chunk

According to one embodiment, the same algorithm is used by all nodes to determine which nodes shall host each chunk. For example, in one embodiment, two database server instances are assigned to host an IMCU of any given chunk by applying a hash function, such as a rendezvous hash, to N hash key values, where each of the hash key values corresponds to a distinct node. The hash key value for a node may be, as explained above, a unique identifier associated with the chunk concatenated to a unique identifier for the node. Applying these N hash key values to the hash function will produce N hash values, each of which correspond to a node. The nodes associated with the two highest hash values are then selected as the two host nodes for the chunk.

As an alternative, hash values may be produced for each of the nodes, as described above. However, rather than select the nodes associated with the two highest hash values to be host nodes for the chunk, the node associated with the highest hash value may be selected to be the first host node. The second host node may then be selected based on which node comes next, after the first host node, in a particular order established for the nodes.

These are merely two ways in which multiple nodes may be selected to host a particular chunk. The techniques described herein are not limited to any particular technique for selecting multiple nodes to host a particular chunk.

IMCU Sets

When chunks are redundantly hosted, the IMCUs in the various nodes of the cluster may be divided into "IMCU sets". According to one embodiment:
  each IMCU belongs to only one IMCU set, and
  each IMCU set includes exactly one IMCU for each chunk.

For example, as illustrated in FIG. 7, the IMCUs in cluster 100 have been divided into two distinct IMCU sets 700 and 702. Each of IMCU sets 700 and 702 has an IMCU for each of chunks 302, 304 and 306. Specifically, IMCU set 700 includes IMCUs 322-1, 324-1 and 326-1 that correspond to chunks 302, 304 and 306, respectively. Similarly, IMCU set 702 includes IMCUs 322-2, 324-2 and 326-2 that correspond to chunks 302, 304 and 306, respectively. IMCU sets 700 and 702 differ with respect to the host node for each chunk. Specifically, in IMCU set 700, chunk 302 is hosted in IMCU 322-1 in node 102. However, in IMCU set 702, the same chunk 302 is hosted in IMCU 322-2 in node 112.

In the example illustrated in FIG. 7, each chunk has two host nodes. Consequently, the IMCUs have been divided into two distinct IMCU sets. However, in a system in which each chunk has three host nodes, the IMCUs may be divided into three distinct IMCU sets.

Mappings for Redundantly Hosted Sub-Chunks

As explained above, each database server instance independently creates and maintains its own sub-chunk-to-node mapping. When a sub-chunk is hosted by multiple nodes, each host node for the sub-chunk will have its own sub-chunk-to-node entry. For example, referring to FIG. 8, it is a block diagram illustrating a sub-chunk-to-node mapping for redundantly hosted sub-chunks in a multi-node database cluster. In the embodiment illustrated in FIG. 8, each entry in the sub-chunk-to-node mapping has information similar to the entries illustrated in the sub-chunk-to-node mappings of FIG. 4. However, unlike the sub-chunk-to-node mappings illustrated in FIG. 4, in FIG. 8 every sub-chunk has two entries in the sub-chunk-to-node mappings, where each entry for the sub-chunk corresponds to a different host-node of the sub-chunk. For example, among the mappings maintained by node 102, entry 802 maps the sub-chunk associated with the disk block range 334 to 336 to node 102, while entry 804 maps the same sub-chunk to node 112.

According to one embodiment, the sub-chunk-to-node mappings maintained by each node are divided into mapping groups that correspond to the IMCU sets. Specifically, as illustrated in FIG. 8, mapping group 820 includes entries in which all sub-chunks are mapped to the IMCUs in IMCU set 700, and mapping group 822 includes entries in which those same sub-chunks are mapped to the IMCUs in IMCU set 702. How mapping groups are used in the assignment and distribution of work granules shall be described in detail hereafter.

Distributing Work Granules when a Chunk has Multiple Hosts

When choosing how to separate and distribute work granules during query execution, the parallel query coordinator chooses a particular mapping group, and then distributes work granules to the database server instances based on the mappings specified for that mapping group. For example, assume database server instance 106 receives a query and assumes the role of parallel query coordinator for the query. The parallel query coordinator may select mapping group 820 as the basis for distributing the work for the query. Thus, work that targets chunks 302, 304 and 306 will be handled by nodes 102, 112 and 122, respectively, using the IMCUs in IMCU set 700.

On the other hand, if mapping group 822 is selected, the mappings associated with mapping group 822 will be used as the basis for distributing the work of the query. Under these circumstances, work that targets chunks 302, 304 and 306 will be handled by nodes 112, 122 and 102, respectively, using the IMCUs in IMCU set 702.

After the work is finished by the various parallel query slaves 106, 116, 126, the results are sent back to the parallel query coordinator 106. The parallel query coordinator 106 then performs any necessary further processing on the data, and sends a response to the application that submitted the query.

Node Failure in a Multiple-Hosts-Per-Chunk System

When a node fails in a single-hosts-per-chunk system, the chunks stored in the failed node's volatile memory cease to be available for query processing. The chunk may be re-hosted elsewhere, as described above, but in the meantime, query execution would normally require accessing some data from disk. However, leveraging redundant chunk hosting, the work granules that target a particular chunk, which may otherwise have been sent to the failed node, are sent instead to another host node for the particular chunk.

Figure 9:
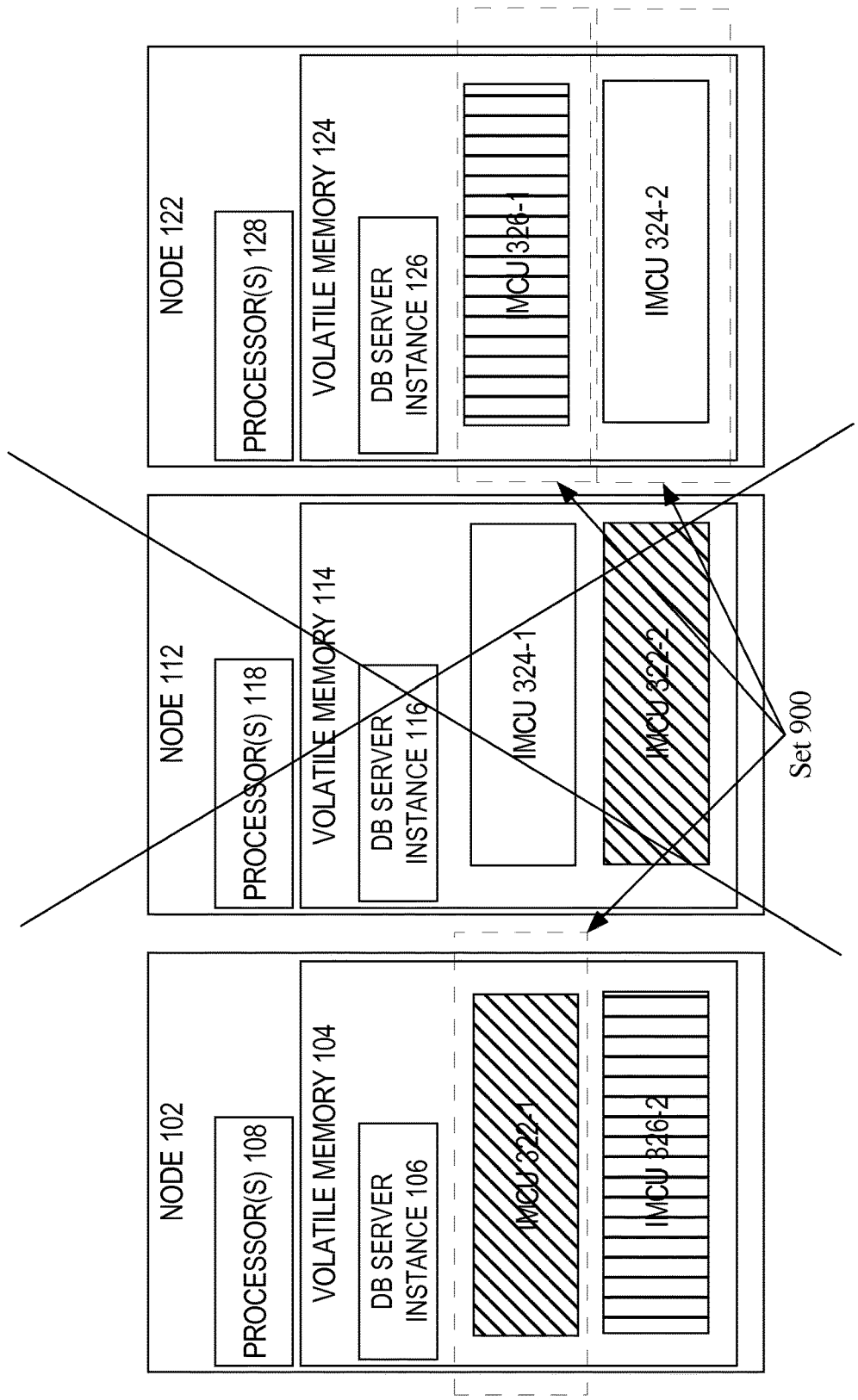
FIG. 9 is a block diagram illustrating redundantly hosted chunks in a multi-node database cluster after a node failure.

FIG. 9 is a block diagram illustrating how nodes are chosen for performing the work granules of a query after a node has failed. For the purpose of explanation, it shall be assumed that IMCU set 700 has been designated the "primary IMCU set" for processing the query, while IMCU set 702 has been designated the "secondary IMCU set" for processing the query.

After receiving a query, the parallel query coordinator 106 distributes all work granules based on the sub-chunk-to-node mappings reflected in the mapping group 820 that corresponds to the primary IMCU set 700, except for those work granules that, based on sub-chunk-to-node mappings of mapping group 820, would be distributed to the failed node 112. The work granules that, based on sub-chunk-to-node mappings of the mapping group 820, would be distributed to the failed node 112 are instead distributed based on the sub-chunk-to-node mappings reflected in the secondary Mapping group 822, which corresponds to the secondary IMCU set 702.

In the present example, based on primary mapping group 820, work for the sub-chunks beginning at addresses 330 and 334 would be assigned to node 102, and work for the sub-chunks beginning at addresses 342 and 346 would be assigned to node 122. On the other hand, based on mapping group 822, work for the sub-chunks beginning at 336 and 340 would be assigned to node 122. Based on these assignments, the work for the query is performed by IMCUs 900, which are IMCUs that reside on working nodes. The final in-parallel query execution includes:
  Database server instance 106 receiving granules that are generated to perform work on sub-chunks located in IMCU 322-1, and
  Database server instance 126 receiving granules that are generated to perform work on sub-chunks located in IMCU 324-2 and IMCU 326-1.

Node failure may occur after work for a query has already been distributed across the cluster. Whenever a node dies in the process of performing work on its own workload, the parallel query coordinator receives a message of the failure, and then restarts the query from scratch. At this time, the query coordinator makes use of both a primary and a secondary IMCU set as described above. For example, work granules may be distributed to database server instances 106, 116, 126 on their respective nodes 102, 112, 122 to perform work against IMCU 322-1, 324-1, and 326-1 respectively. If node 112 fails while executing its own work granule against IMCU 324-1. The parallel query coordinator would receive a message regarding the failure, and restart execution of the query from scratch. The parallel query coordinator creates a new query execution plan leveraging the set of IMCUs 900. The parallel query coordinator distributes work granules for performing work against IMCU 322-1 to database server instance 106 on node 102, and work granules to perform against IMCU 324-2 and IMCU 326-1 to database server instance 126 on node 122.

Alternatively, rather than re-executing the entire query from scratch, the parallel query coordinator may identify the chunks residing on the failed node by scanning the chunk-to-node mapping. Then, the work granules created to execute against those chunks are resent to a different node based on the chunk-to-node mapping of the identified chunk in the secondary set of IMCUs.

Executing Two Queries Concurrently

When a chunk is hosted by more than one node, each host node for the chunk can execute a query that accesses that chunk in parallel with another host node that is executing a query that accesses that chunk. Under these circumstances, each host node will access its own local IMCU for the chunk.

When two nodes are executing queries against copies of the same IMCU, shared locks may be granted over the data contained in the IMCUs. Further, coordination between the nodes is not necessary when both queries are read-only. However, when one or more of the queries that are executing in parallel require DML operations to be performed on data contained in the IMCU, before either node performs an update:

the node performing the update acquires an exclusive lock that covers the data that is to be updated the nodes that are not performing the update lose their shared locks on the data, and invalidate the portion of their IMCU that corresponds to that data Additional details about how parallel DML operations are handled in multiple-hosts-per-chunk system are provided in U.S. Provisional Patent Application No. 62/168,692, which is incorporated herein by this reference.

In one embodiment, when determining how to distribute work granules for a first query, the parallel query coordinator distributes work granules based on the mappings of one mapping group 820. Then, when another query is received that requires work on the same chunk, parallel query coordinator distributes work granules based on mappings of another mapping group 822. Since different mapping groups map the same chunk to different host nodes, switching the mapping groups from query to query causes the work associated with a particular chunk to be distributed among the various host nodes of the chunk.

Parallelism in NUMA Systems

Figure 10:
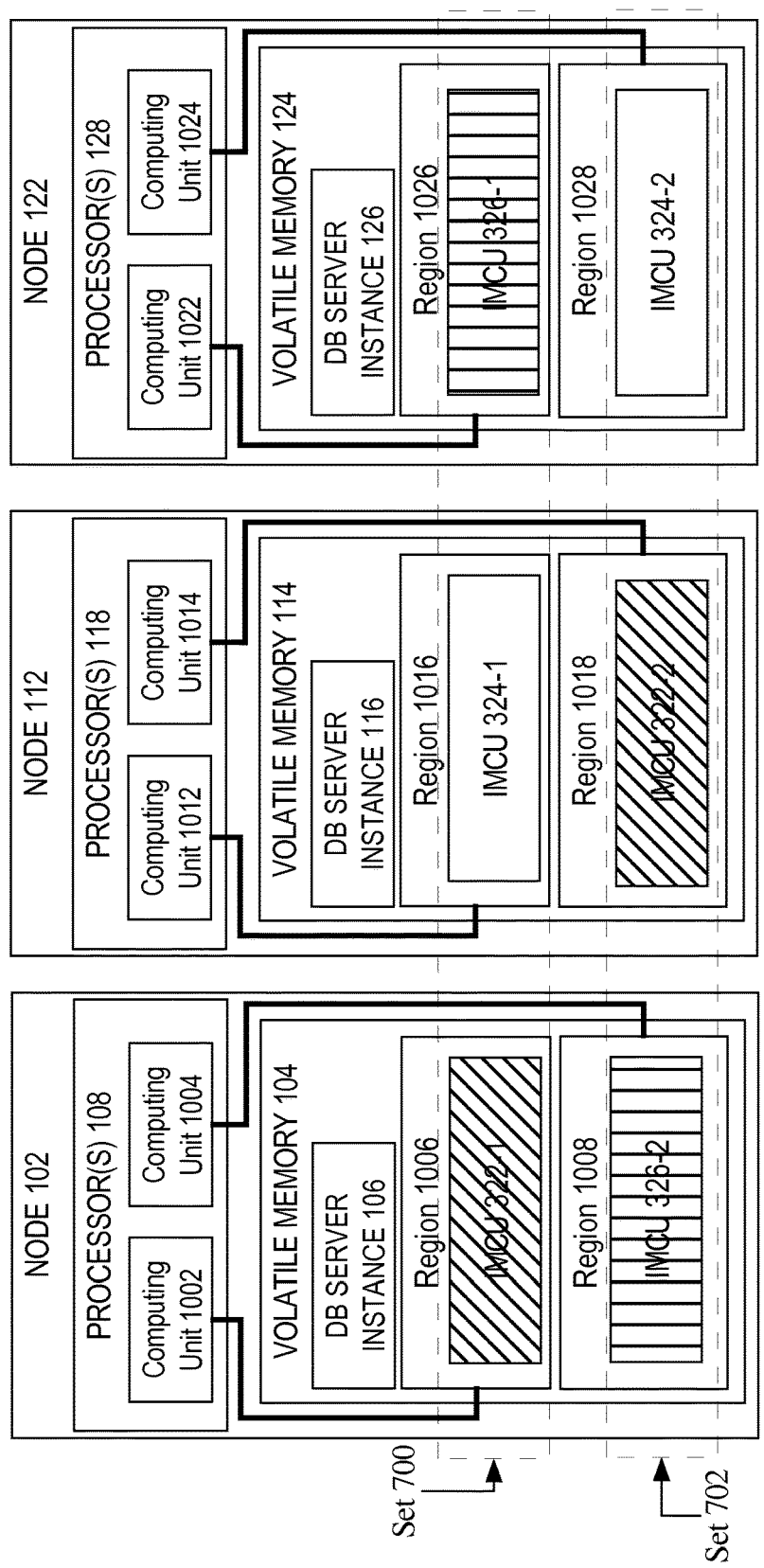
FIG. 10 is a block diagram illustrating redundantly hosted chunks in different regions of volatile memories on a NUMA system in a multi-node database cluster.

As illustrated in FIG. 7, a single node may host multiple IMCUs. For example, node 102 hosts IMCUs 322-1 and 326-2. In a NUMA system, the IMCUs hosted by a single node may reside in regions of volatile memory that correspond to different computing units. For example, as illustrated in FIG. 10, IMCU 322-1 resides in a region 1006 of volatile memory 104, and IMCU 326-2 resides in a different region 1008 of volatile memory 104. In redundantly hosted systems, the IMCUs within the single node can belong to different IMCU sets. For example, as illustrated in FIG. 10, IMCU 322-1 belongs to set 700 and IMCU 326-2 belongs to set 702.

After receiving two queries that require work against the same set of data, the parallel query coordinator(s) creates work granules for the first query based on the first mapping group 820 and creates work granules for the second query based on the second mapping group 822. When receiving work granules for the two separate queries that require work against the same segment of data, a single node may perform the work designated by the work granules in parallel, on two separate computing units. Because a different mapping group is used for each work granule, in-parallel query execution happens at both the cluster level and the node level. For example, referring to FIG. 10, after sending out work granules for two queries based on the mapping groups in FIG. 8:

For the first query, database server instance 106 performs work against data residing in IMCU 322-1 using NUMA1 (computing unit 1002 with high speed access to region 1006), while performing work against data residing in IMCU 326-2 using NUMA4 (computing unit 1004 with high speed access to region 1008) for the second query;

For the first query, database server instance 116 performs work against data residing in IMCU 324-1 using NUMA2 (computing unit 1012 with high speed access to region 1016), while performing work against data residing in IMCU 322-2 using NUMA5 (computing unit 1014 with high speed access to region 1018) for the second query; and For the first query, database server instance 126 performing work against data residing in IMCU 326-1 using NUMA3 (computing unit 1022 with high speed access to region 1026), while performing work against data residing in IMCU 324-2 using NUMA6 (computing unit 1024 with high speed access to region 1028) for the second query.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
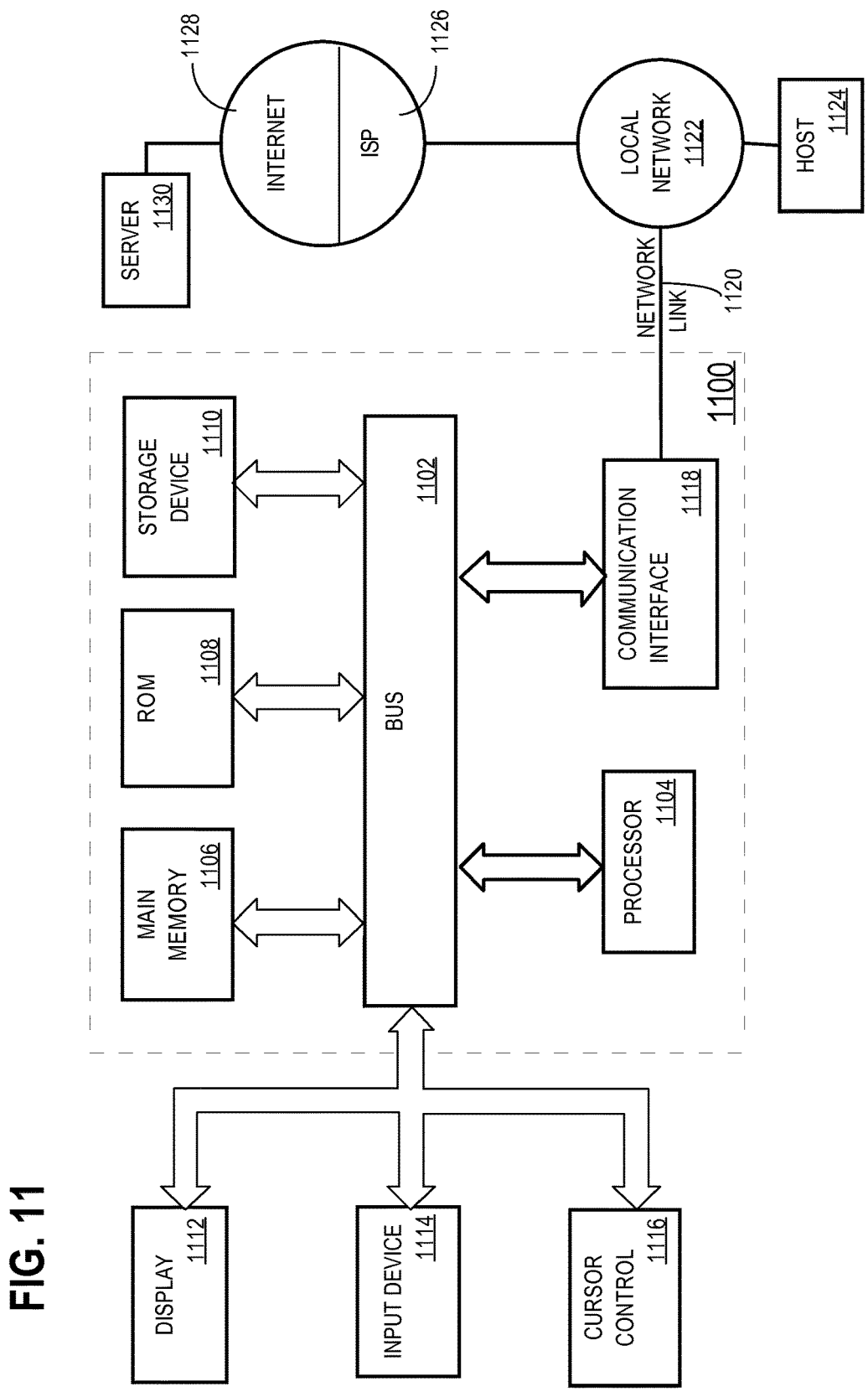
FIG. 11 is a block diagram illustrating a computer system that may be used to implement the techniques described herein.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing a set of data on non-volatile storage that is remote from, but accessible to, a plurality of nodes;
   prior to receiving a query that targets the set of data, performing the steps of:
      creating, in volatile memory that is local to each node of the plurality of nodes, a mapping that indicates:
         a plurality of chunks into which the set of data has been divided, and one or more host nodes for each chunk of the plurality of chunks;
      for each chunk of the plurality of chunks, and at each node that is designated as a host node for the respective chunk, loading the respective chunk into volatile memory that is local to the host node; and
   in response to receiving the query, distributing work required by the query to one or more nodes of the plurality of nodes based on the mapping.

2. The method of claim 1, wherein the mapping indicates a plurality of host nodes for a particular chunk of the plurality of chunks.

3. The method of claim 2, wherein the particular chunk is hosted by a subset of the plurality of nodes, wherein the subset of the plurality of nodes does not include all of the plurality of nodes.

4. The method of claim 2, further comprising determining the plurality of host nodes for the particular chunk by:
   for the particular chunk, generating a hash key value for each node of the plurality of nodes;
   applying the hash key value of each of the plurality of nodes to a rendezvous hash function to produce a plurality of hash values; and
   choosing the plurality of host nodes for the particular chunk based on the plurality of hash values.

5. The method of claim 2, wherein:
   the mapping is divided into a plurality of mapping groups, including a first mapping group and a second mapping group;
   the first mapping group maps a first copy of each of the plurality of chunks to the plurality of nodes;
   a second mapping group maps a second copy of each of the plurality of chunks to the plurality of nodes; and
   for each chunk of the plurality of chunks, the first copy of a respective chunk is mapped to a different node than the second copy of the respective chunk.

6. The method of claim 5, wherein said distributing the work required by the query is based, at least in part, on the first mapping group.

7. The method of claim 6, further comprising:
   wherein the query is a first query;
   in response to receiving an additional query that targets the set of data, distributing the work required by the additional query based on the second mapping group to cause work required by the additional query against a specific chunk to be performed in parallel by a different node than the work required by the first query for the specific chunk.

8. The method of claim 7:
   wherein each host node of the plurality of host nodes has a respective plurality of computing units with access to different regions of local volatile memory;
   wherein each host node of the plurality of nodes has a respective first group of one or more chunks from the first copy of the plurality of chunks loaded into a different region of local volatile memory than a second group of one or more chunks from the second copy of the plurality of chunks;
   wherein for each host node of the plurality of host nodes, the respective host node processes a first granule for the work required by the query and a second granule for additional work required by the additional query on its respective plurality of computing units in parallel.

9. The method of claim 5, further comprising:
   detecting failure of a particular node of the plurality of nodes;
   wherein distributing work required by the query to one or more nodes of the plurality of nodes comprises:
      distributing work required by the query to host nodes designated in the first mapping group, except for particular work that the first mapping group would cause to be sent to the particular node; and
      for the particular work that the first mapping group would cause to be sent to the particular node, distributing the particular work to one or more host nodes designated in the second mapping group that host data required for the particular work.

10. The method of claim 1, further comprising:
    in response to receiving the query, dividing the work required by the query into a set of granules;
    wherein each granule requires work to be performed on a sub-chunk; and
    wherein each sub-chunk belongs to only one chunk.

11. The method of claim 10, wherein said distributing work required by the query to one or more nodes of the plurality of nodes further comprises:
    sending to a particular host node of a particular chunk, in a single message, all granules from the set of granules that require work to be performed against a set of sub-chunks belonging to the particular chunk; and
    in response to receiving the single message, the particular host node of the particular chunk performing the work against all sub-chunks, in the set of sub-chunks belonging to the particular chunk, by reading the particular chunk in a single pass.

12. One or more non-transitory computer-readable media storing instructions that, when executed by one or more computing devices, cause:
    storing a set of data on non-volatile storage that is remote from, but accessible to, a plurality of nodes;
    prior to receiving a query that targets the set of data, performing the steps of:
       creating, in volatile memory that is local to each node of the plurality of nodes, a mapping that indicates:
          a plurality of chunks into which the set of data has been divided, and one or more host nodes for each chunk of the plurality of chunks;
       for each chunk of the plurality of chunks, and at each node that is designated as a host node for the respective chunk, loading the respective chunk into volatile memory that is local to the host node; and
    in response to receiving the query, distributing work required by the query to one or more nodes of the plurality of nodes based on the mapping.

13. The one or more non-transitory computer-readable media of claim 12, wherein the mapping indicates a plurality of host nodes for a particular chunk of the plurality of chunks.

14. The one or more non-transitory computer-readable media of claim 13, wherein the particular chunk is hosted by a subset of the plurality of nodes, wherein the subset of the plurality of nodes does not include all of the plurality of nodes.

15. The one or more non-transitory computer-readable media of claim 13, wherein the instructions further comprise instructions that, when executed by one or more computing devices, cause determining the plurality of host nodes for the particular chunk by:
- for the particular chunk, generating a hash key value for each node of the plurality of nodes;
- applying the hash key value of each of the plurality of nodes to a rendezvous hash function to produce a plurality of hash values; and
- choosing the plurality of host nodes for the particular chunk based on the plurality of hash values.

16. The one or more non-transitory computer-readable media of claim 13, wherein:
- the mapping is divided into a plurality of mapping groups, including a first mapping group and a second mapping group;
- the first mapping group maps a first copy of each of the plurality of chunks to the plurality of nodes;
- a second mapping group maps a second copy of each of the plurality of chunks to the plurality of nodes; and
- for each chunk of the plurality of chunks, the first copy of a respective chunk is mapped to a different node than the second copy of the respective chunk.

17. The one or more non-transitory computer-readable media of claim 16, wherein said distributing the work required by the query is based, at least in part, on the first mapping group.

18. The one or more non-transitory computer-readable media of claim 17, wherein the instructions further comprise instructions that, when executed by one or more computing devices, cause:
- wherein the query is a first query;
- in response to receiving an additional query that targets the set of data, distributing the work required by the additional query based on the second mapping group to cause work required by the additional query against a specific chunk to be performed in parallel by a different node than the work required by the first query for the specific chunk.

19. The one or more non-transitory computer-readable media of claim 18:
- wherein each host node of the plurality of host nodes has a respective plurality of computing units with access to different regions of local volatile memory;
- wherein each host node of the plurality of nodes has a respective first group of one or more chunks from the first copy of the plurality of chunks loaded into a different region of local volatile memory than a second group of one or more chunks from the second copy of the plurality of chunks;
- wherein for each host node of the plurality of host nodes, the respective host node processes a first granule for the work required by the query and a second granule for additional work required by the additional query on its respective plurality of computing units in parallel.

20. The one or more non-transitory computer-readable media of claim 16, wherein the instructions further comprise instructions that, when executed by one or more computing devices, cause:
- detecting failure of a particular node of the plurality of nodes;
- wherein distributing work required by the query to one or more nodes of the plurality of nodes comprises:
  - distributing work required by the query to host nodes designated in the first mapping group, except for particular work that the first mapping group would cause to be sent to the particular node; and
  - for the particular work that the first mapping group would cause to be sent to the particular node, distributing the particular work to one or more host nodes designated in the second mapping group that host data required for the particular work.

21. The one or more non-transitory computer-readable media of claim 12, wherein the instructions further comprise instructions that, when executed by one or more computing devices, cause:
- in response to receiving the query, dividing the work required by the query into a set of granules;
- wherein each granule requires work to be performed on a sub-chunk; and
- wherein each sub-chunk belongs to only one chunk.

22. The one or more non-transitory computer-readable media of claim 21, wherein said distributing work required by the query to one or more nodes of the plurality of nodes further comprises:
- sending to a particular host node of a particular chunk, in a single message, all granules from the set of granules that require work to be performed against a set of sub-chunks belonging to the particular chunk; and
- in response to receiving the single message, the particular host node of the particular chunk performing the work against all sub-chunks, in the set of sub-chunks belonging to the particular chunk, by reading the particular chunk in a single pass.

* * * * *